Aug. 25, 1959     R. C. ANDERSEN     2,901,272
EXPANSION JOINT
Filed Jan. 9, 1956
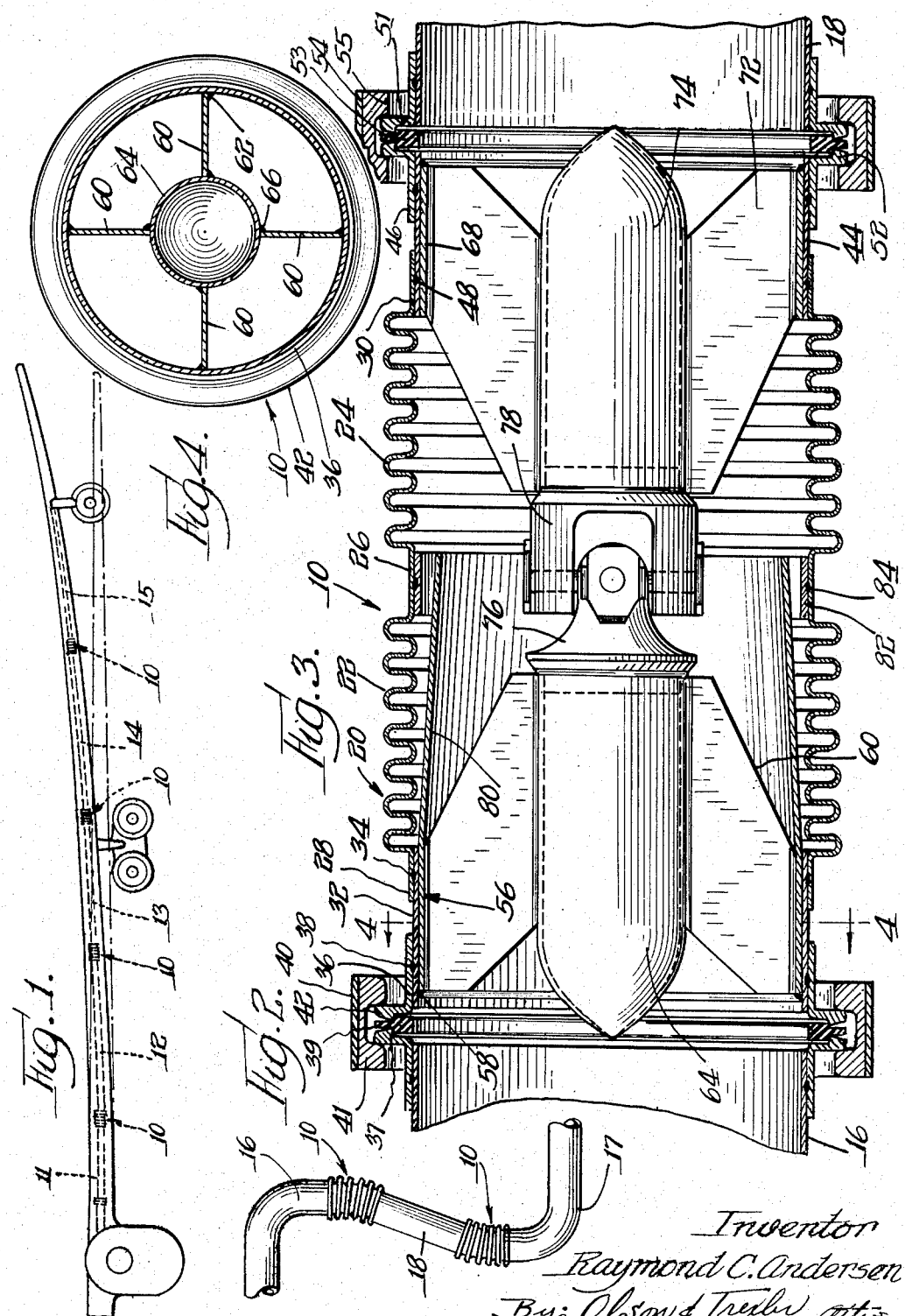
Inventor
Raymond C. Andersen
By: Olson & Trexler Attys.

United States Patent Office 2,901,272
Patented Aug. 25, 1959

2,901,272
EXPANSION JOINT

Raymond C. Andersen, Lombard, Ill., assignor to Flexonics Corporation, Maywood, Ill., a corporation of Illinois Application January 9, 1956, Serial No. 557,883

3 Claims. (Cl. 285—227)

The present invention relates to a novel expansion joint, and more particularly to a novel self-contained expansion joint adapted to resist axial elongation.

An object of the present invention is to provide a novel self-contained expansion joint of the type including a section of corrugated tubing, which expansion joint is constructed so that opposite ends thereof may be shifted laterally with respect to each other during use and so as to resist axial elongation without the aid of tie rods extending between opposite ends of the joint and disposed externally of the corrugated tube as is now the common practice so that the expansion joint will be relatively compact so that it may be more easily used in installations having a limited available space.

Another object of the present invention is to provide a novel expansion joint of the type set forth in the preceding paragraph which is constructed so as positively to limit the amount which opposite ends of the joint may become offset laterally with respect to each other.

A more specific object of the present invention is to provide a novel self-contained expansion joint having means disposed internally of a corrugated tubing section for preventing axial extension or undue displacement of the opposite ends of the joint.

A more specific object of the present invention is to provide a novel expansion joint of the type set forth in the preceding paragraph wherein said means for limiting axial extension and lateral displacement is constructed so as to minimize turbulence of fluid flowing through the joint and also so as to provide the joint with relatively great strength without undue weight.

Other objects and advantages of the present invention will become apparent from the following description in the accompanying drawings wherein:

Fig. 1 is a fragmentary elevational view illustrating an expansion joint incorporating the features of the present invention incorporated in a heating system of an airplane wing;

Fig. 2 is a fragmentary view showing how a pair of expansion joints of the present invention may be incorporated in a fluid line having bends therein;

Fig. 3 is an enlarged view partially in cross section showing an expansion joint incorporating the novel features of the present invention; and Fig. 4 is a sectional view taken along line 4—4 in Fig. 3.

It will be appreciated that the novel expansion joint of the present invention may be used in various installations, and as a result of the compact, rugged and light weight construction which will be described in detail below, the expansion joint is especially adapted for use between pipe sections of a gas or fluid system in an airplane or the like. This is illustrated somewhat diagrammatically in Fig. 1 wherein expansion joints 10 incorporating the features of the present invention are connected between pipe sections 11, 12, 13, 14 and 15 extending longitudinally in an airplane wing. The expansion joint 10 is constructed so as to accommodate lateral displacement of the ends of adjacent pipe portions, which displacement may be the result of deflection of the wing.

Fig. 2 illustrates a manner in which a pair of the joints 10 may be installed between curved and initially generally aligned end portions of offset generally parallel conduits 16 and 17 with a pipe section 18 between the joints for accommodating expansion and contraction of the conduits or pipe sections 16 and 17. When the pipe sections are extended, as shown, the two joints 10 permit radial movement of the curved ends with respect to the joints so that the pipe section 18 is disposed at an angle to the vertical and the initially parallel portions of the pipes 16 and 17 are slightly shifted angularly with respect to each other. If the assembly of Fig. 2 is incorporated in the structure of Fig. 1, it is obvious that the resulting structure could accommodate flexing of the wing up and down as well as motion in a horizontal direction.

Referring now more specifically to Figs. 3 and 4, the expansion joint 10 comprises an outer tube 20 having elongated corrugated sections 22 and 24 separated by a relatively short cylindrical section 26, and opposite relatively short cylindrical end sections 28 and 30. A separate tubular section 32 is slipped within the annular section 28 of the corrugated tube and secured thereto by means of an annular resistance weld 34. An end pipe connector sleeve 36 is slipped over the tubular section 32 and is secured thereto by means of an annular resistance weld 38, and the opposite end of the connector 36 is adapted to be secured to a complementary flange 37 welded to the pipe section 16 by means including a gasket 39 and a clamping band 40 and ring 41. The opposite end of the expansion joint is similarly constructed and includes a tubular section 44 and a pipe connector sleeve 46. The tubular section 44 is secured to the annular end section 30 of the corrugated tube by means of an annular resistance weld 48 and to the connector sleeve by means of an annular resistance weld 50. This connector sleeve may also be provided with an annular flange 52 and is adapted to be connected with a flange 51 on the pipe section 18 by means including a gasket 53 and a clamping band 54 and ring 55.

In order to prevent axial expansion or contraction of the joint while permitting positively limited radial deflection of opposite ends of the joint, universal joint means extends within the corrugated tube and is connected with opposite ends of the expansion joint. This means comprises a sleeve 56 disposed within the tubular section 32 at the inlet end of the expansion joint and fusion welded thereto at 58. A plurality of radially disposed and axially extending sheet metal fins 60 are disposed within and welded to the sleeve 56 as at 62 and support a centrally located sheet metal tube 64. The fins are fusion welded to the centrally located tube as at 66. Similarly, at the opposite end of the expansion joint a sleeve 68 is disposed within and welded to the tubular section 44 as at 70, and a plurality of radially disposed fins 72 are fusion welded to the sleeve 68 and are also fusion welded to and support a centrally located sheet metal tube 74. Adjacent ends of the tubes 64 and 74 are open and respectively receive fork members 76 and 78 of a universal joint which are respectively welded to their associated tubes and are pivotally connected in a known manner. The fins and sheet metal tubes 64 and 74 provide the expansion joint with relatively great strength and resistance to axially directed forces without unduly increasing the weight of the joint, and since these elements are located within the corrugated tube it will be appreciated that the expansion joint construction is quite compact.

The expansion joint construction is such that turbulence of fluid or gas flowing therethrough is reduced and resonance which might occur as a result of a high velocity gas flow contacting the corrugated tubing is substantially eliminated. More specifically, the forward end of the tube 64 at the inlet end of the expansion joint is tapered or pointed and closed in the manner shown to promote laminar flow of the fluid around the tube, and the downstream end of the tube 74 is similarly streamlined. Laminar flow of fluid is further enhanced by the thin radially extending fins which serve to dampen any turbulence which might develop and straighten out the fluid flow lines. In addition it is important to note that the sleeve 56 is provided with an extension 80 which extends through the sections 22 and 26 of the corrugated tube and tapers inwardly. The sleeve section 80 serves to prevent the fluid from contacting the corrugations 22 and directs the fluid inwardly so that contact of the fluid stream with the corrugations 24 is minimized.

In order positively to limit the permissible amount of relative radial deflection between opposite ends of the expansion joint, a reinforcing and stop band 82 is disposed within the section 26 of the corrugated tube and secured thereto by means of a resistance weld 84. It should be noted that both the band 82 and the end of the sleeve section 80 traverse the pivotal connection of the universal joint. Thus, the opposite ends of the expansion joint may be laterally or radially deflected with respect to each other until the band 82 engages the sleeve section 80 whereupon further relative radial deflection is restrained.

From the above description it is seen that the present invention has provided a novel self-contained expansion joint which is constructed so as to minimize turbulence and resonance therein and also to permit positively limited radial deflection between opposite ends thereof. It is further seen that the present invention has provided a novel expansion joint which is of compact construction and which is relatively light in weight while having high resistance to axial stresses.

While the preferred embodiment of the present invention has been shown and described herein, it is obvious that many structural details may be changed without departing from the spirit and scope of the appended claims.

The invention is claimed as follows:

1. A self-contained expansion joint comprising an elongated tube having a pair of elongated inlet and outlet corrugated sections separated by an integral relatively short cylindrical section and a pair of opposite cylindrical end sections, the inner diameters of each of said cylindrical sections and the minimum diameters of said corrugated sections being substantially the same; a pair of cylindrical end members respectively extending into and welded to opposite end sections of said tube, a pair of sleeve members disposed within and welded to said cylindrical members, a plurality of narrow radially disposed and axially extending fins disposed within and welded to said sleeve members at the opposite ends of said tube, a pair of relatively light hollow streamlined members respectively supported intermediate the ends thereof and in axial alignment by the fins adjacent the opposite ends of said tube and the adjacent ends of said hollow members being bifurcated and disposed in interfitting relationship and in radial alignment with said short cylindrical section, said fins extending toward and terminating adjacent the bifurcated ends of said hollow members, pivot means interconnecting the bifurcated ends of said hollow members to provide a universal joint therebetween, said universal joint limiting axial expansion of said tube while permitting radial deflection of opposite ends of the tube, one of said sleeve members adjacent the inlet end of said tube having an inwardly tapering sleeve extension traversing the adjacent inlet corrugated section of the tube and said intermediate short cylindrical section and the pivotal interconnection between the bifurcated ends of said hollow members, the inner extremity of said sleeve extension terminating downstream of the inlet corrugated section and radially inwardly of and closely adjacent to the adjacent end of the outlet corrugated section; the free end of said sleeve extension, said fins and said hollow streamlined members serving to promote laminar fluid flow through said tube with the tapering sleeve extension preventing contact of the fluid with the inlet corrugated section and directing fluid inwardly of the outlet corrugated section to minimize contact of the flowing fluid with the outlet corrugated section, and a reinforcing and stop band disposed within and secured to the intermediate short cylindrical section of the tube and traversing the pivotal interconnection between the bifurcated ends of the hollow members, said sleeve extension normally being radially inwardly spaced from said reinforcing and stop band and being engageable therewith after a predetermined amount of relative radial deflection between opposite ends of the tube to restrain said tube ends against further relative radial deflection.

2. A self-contained expansion joint as claimed in claim 1, wherein the short cylindrical section and the reinforcing and stop band are substantially coextensive in axial length.

3. A self-contained expansion joint as claimed in claim 1, wherein there are at least four fins equally spaced about each of said streamlined members.

References Cited in the file of this patent

UNITED STATES PATENTS

| | | |
|---|---|---|
| 979,513 | Koenig | Dec. 27, 1910 |
| 1,790,266 | Fullmer | Jan. 27, 1931 |
| 2,337,038 | Fentress | Dec. 21, 1943 |
| 2,473,618 | Stillwagon | June 21, 1949 |
| 2,761,701 | Morse et al. | Sept. 4, 1956 |

FOREIGN PATENTS

| | | |
|---|---|---|
| 10,321 | Great Britain | July 23, 1887 |
| 658,066 | France | Jan. 22, 1929 |